Patented June 5, 1951

2,555,410

UNITED STATES PATENT OFFICE 2,555,410

PROCESS OF MAKING ORGANIC ACIDS FROM CARBONACEOUS MATERIAL

Henry C. Howard, Mount Lebanon, Pa., assignor to Carnegie Institute of Technology, Pittsburgh, Pa., a corporation of Pennsylvania No Drawing. Application June 2, 1949, Serial No. 96,818

5 Claims. (Cl. 260—515)

This invention relates to a process of making organic acids from carbonaceous material. This application is a continuation-in-part of my application Serial No. 763,169, filed July 23, 1947, now abandoned, which application was a continuation-in-part of application Serial No. 588,260, filed April 13, 1945, now abandoned. The term "carbonaceous material" as used herein means coal, coke, carbon blacks and pitch.

Among the organic acids which may be produced according to my invention are the acids of aromatic or benzenoid type, such, for example, as mellitic acid, benzene pentacarboxylic acid, and the benzene tetra, tri and dicarboxylic acids; and aliphatic acids, as, for example, oxalic acid and acetic acid. All of the acids mentioned are soluble in water and are sublimable or distillable. In addition to the above named acids there are also formed acids of complex and unknown structure, but of value in commerce.

It is known that bituminous coals and related carbonaceous materials can be oxidized to simple water-soluble acids by the prolonged action of nitric acid at normal pressures and at temperatures of approximately 100° C. Since the desired reaction requires oxidation of 20 to 50% of the carbon of the coal to carbon dioxide, the latter figure corresponding to approximately 1.5 lbs. of oxygen per lb. of coal, it is necessary to supply relatively large amounts of nitric acid per lb. of organic acids produced. Further, even with concentrated acid, the process is slow, requiring several days' contact with the boiling nitric acid to bring about the desired reaction.

The process according to the present invention reduces significantly the amount of nitric acid employed and increases very greatly the speed of the reaction. These desirable effects are obtained by carrying out the reaction at elevated temperatures in a suitable pressure vessel in the presence of a high partial pressure of oxygen gas. For instance, in the reaction of nitric acid with coal, the nitric acid is for the most part reduced to nitric oxide, but in the presence of an excess of oxygen and of water, this oxide is rapidly reconverted to nitric acid by well-known reactions. Thus, in this process the amount of nitric acid required in the system at any one time in treating a given amount of carbonaceous material is greatly reduced.

The following are examples of my process.

Example 1

One hundred grams of coal are treated with one thousand ml. of 2 molar nitric acid at 150° C. for 24 hours in the presence of oxygen gas at 600 pounds per square inch pressure. The yield of water-soluble organic acids is 60 to 70% of the weight of the coal used. The nitric acid recovered amounts to 60% or more of that initially charged and hence the consumption of nitric acid is about 0.8 gram mol per 100 grams of coal oxidized. On a larger scale of operation it is probable that still more complete recoveries of nitric acid will be obtained.

In order to increase the reaction rate of the nitric acid with the carbonaceous material, temperatures higher than 150° C. may be employed, but the regeneration of nitric acid by the oxidizing gas is less complete due to more rapid reduction of the nitric oxide to nitrogen than oxidation of nitric oxide to the higher oxides. Therefore, temperatures not over 170° C. are preferred. Temperatures as low as 80° C. have been found to be effective.

Example 2

Twenty grams of finely ground coke, prepared by carbonization of a Pittsburgh Seam coal at 500° C., were placed in a pressure vessel along with 200 cc. of 4 molar nitric acid. The vessel was closed and oxygen gas was fed into the vessel until a pressure of 500 pounds per square inch of oxygen was attained. The vessel was heated to 160° C. and maintained at that temperature for 8 hours. The vessel was rocked during this period to agitate the contents. After this period the vessel was cooled and the pressure was released. The contents of the vessel consisted of a yellow to orange colored nitric acid solution of the oxidation products of the coal containing the mineral matter of the coal in suspension. The suspended mineral matter was separated from this solution by filtration and the organic acids were recovered by extraction with an appropriate organic solvent. The organic solvent was removed from the organic acids and the organic acids were dried. The weight of dried organic acids recovered was 13 grams. Forty grams of nitric acid were recovered from the aqueous solution. The mixture of organic acids is yellow to orange in color, has an average equivalent weight of 80 and has, on the average, approximately three carboxyl groups per molecule.

Example 3

This example is identical with Example 2, except that carbon black was used instead of coke and the weight of dried organic acids recovered was 5 grams and the weight of nitric acid recovered was 24 grams.

Example 4

This example is identical with Example 2, except that a hard coal tar pitch was used instead of coke and the weight of dried organic acids recovered was 10 grams and the weight of nitric acid recovered was 38 grams.

Example 5

This example is identical with Example 2, except that coal was used instead of coke and the temperature was reduced to 112° C. The weight of dried organic acids recovered was 4.4 grams and the weight of nitric acid recovered was 48 grams.

In carrying out the process, it is preferred that the partial pressure of oxygen in the oxidizing gas be between 100 and 1000 pounds per square inch. In any of the examples air or any other mixture containing gaseous oxygen can be employed in place of the pure oxygen gas. The only difference between the use of air and pure oxygen is that a correspondingly higher total pressure is required to attain a given partial pressure of oxygen when a mixture such as air is used instead of pure oxygen. During the operation of the process the nitric acid is alternately reduced by reaction with the carbonaceous material and reoxidized by the oxidizing gas.

The invention is not limited to the preferred materials or proportions which have been given merely for purposes of illustration but may be otherwise embodied or practiced within the scope of the following claims.

I claim:

1. The process of making organic acids from carbonaceous material selected from the group consisting of coal, coke, carbon blacks and pitch, which comprises simultaneously oxidizing said carbonaceous material at elevated temperature with nitric acid and oxygen at a partial pressure of oxygen of 100 to 1000 pounds per square inch.

2. The process of making organic acids from coal, which comprises simultaneously oxidizing it at elevated temperature with nitric acid and oxygen at a partial pressure of oxygen of 100 to 1000 pounds per square inch.

3. The process of making organic acids from coke, which comprises simultaneously oxidizing it at elevated temperature with nitric acid and oxygen at a partial pressure of oxygen of 100 to 1000 pounds per square inch.

4. The process of making organic acids from pitch, which comprises simultaneously oxidizing it at elevated temperature with nitric acid and oxygen at a partial pressure of oxygen of 100 to 1000 pounds per square inch.

5. The process of making organic acids from carbonaceous material selected from the group consisting of coal, coke, carbon blacks and pitch, which comprises simultaneously oxidizing said carbonaceous material at a temperature of 80° C. to 170° C. with nitric acid and oxygen at a partial pressure of oxygen of 100 to 1000 pounds per square inch.

HENRY C. HOWARD.

REFERENCES CITED

The following references are of record in the file of this patent:

UNITED STATES PATENTS

| Number | Name | Date |
|---|---|---|
| 1,520,885 | Rankin | Dec. 30, 1924 |
| 2,176,348 | Juettner | Oct. 17, 1939 |

FOREIGN PATENTS

| Number | Country | Date |
|---|---|---|
| 223,537 | Switzerland | Dec. 1, 1942 |
| 879,182 | France | Feb. 16, 1943 |